(12) United States Patent
Kayoukluk

(10) Patent No.: US 7,455,344 B2
(45) Date of Patent: Nov. 25, 2008

(54) SNOWMOBILE PLASTIC WINDSHIELD STABILIZER

(76) Inventor: Larry Kayoukluk, P.O. Box 5026, Koliganek, AK (US) 32506

( * ) Notice: Subject to any disclaimer, the term of this patent is extended or adjusted under 35 U.S.C. 154(b) by 0 days.

(21) Appl. No.: 11/400,123

(22) Filed: Jul. 25, 2006

(65) Prior Publication Data

US 2008/0023980 A1     Jan. 31, 2008

(51) Int. Cl.
*B60J 1/02* (2006.01)
(52) U.S. Cl. ........................................................ 296/90
(58) Field of Classification Search ............... 296/78.1, 296/84.1, 96.12, 1.04, 90; 280/749
See application file for complete search history.

(56) References Cited

U.S. PATENT DOCUMENTS

| | | | | |
|---|---|---|---|---|
| 1,532,008 A | * | 3/1925 | Walford | ..................... 296/78.1 |
| RE23,039 E | * | 9/1948 | Comiskey | ................... 296/78.1 |
| 2,556,003 A | * | 6/1951 | Sandell et al. | ........... 15/104.92 |
| 2,675,266 A | * | 4/1954 | Comisky, Sr. | ............... 296/78.1 |
| 3,637,254 A | * | 1/1972 | Lapointe et al. | .......... 296/96.21 |
| 3,801,152 A | * | 4/1974 | Tims et al. | ................. 296/78.1 |
| 3,904,238 A | * | 9/1975 | Anderson et al. | .......... 296/78.1 |
| 6,783,040 B2 | * | 8/2004 | Batchelor | .................... 224/413 |

* cited by examiner

*Primary Examiner*—Dennis H Pedder
*Assistant Examiner*—Melissa A Black

(57) ABSTRACT

A windshield stabilizing apparatus comprising two pairs of suction cup assemblies adjustably connected to a horizontal elongated tether or nylon fence which pivotally connects to the right and left sides of the snow mobile windshield adding lateral support increasing stability and rigidity. By connecting each side of the windshield, added stability is achieved for the rider at high and low speeds. The stabilizing device can be disconnected by the release of the tether hook located in the middle of the tension tether.

1 Claim, 7 Drawing Sheets

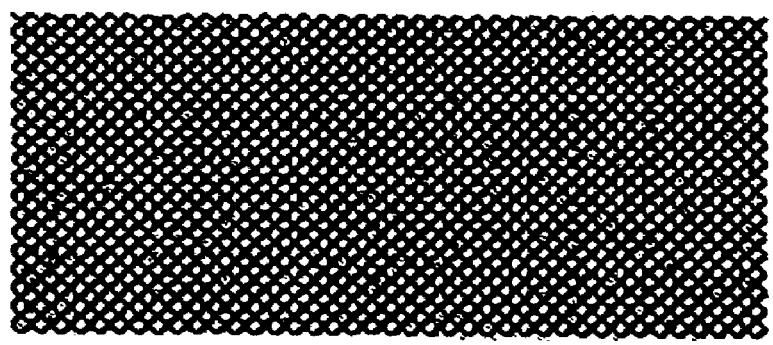
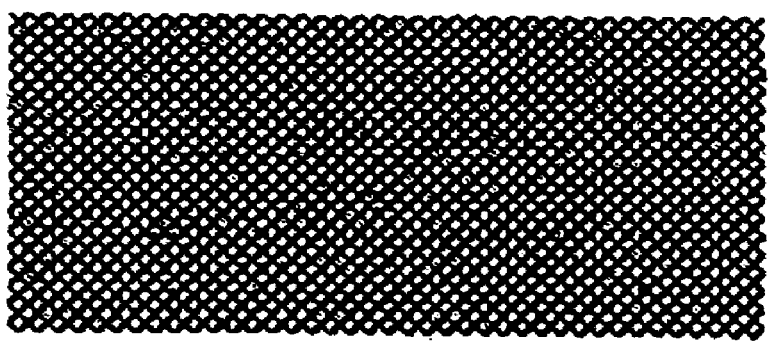
Figure 2

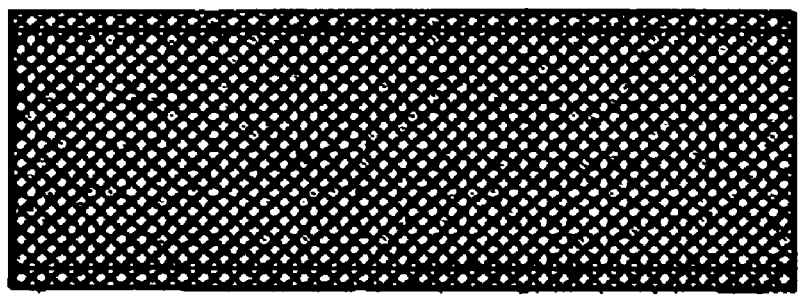
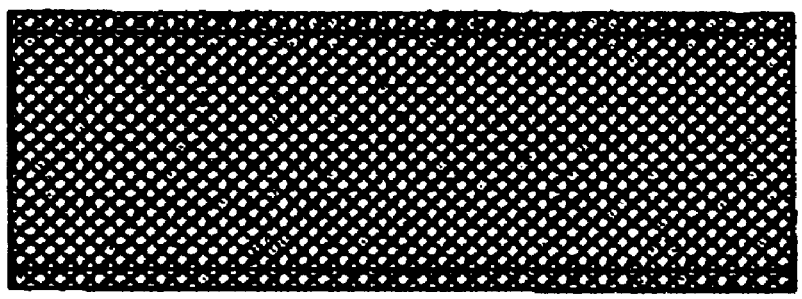
Figure 3

Figure 5

SNOWMOBILE PLASTIC WINDSHIELD STABILIZER

FIELD OF THE INVENTION

The present invention, primarily relates to support assemblies for adjustably stabilizing a windshield on motorcycles, snowmobiles and like vehicles while allowing dashboard stowage.

DESCRIPTION OF THE PRIOR ART

In this modern and increasingly mobile society, many families and individuals own various types of vehicles such as bicycles, mopeds, motorcycles, snowmobiles and the like. Although different windshield mounting assemblies have been proposed for use on the aforementioned vehicles, there has generally not been a windshield mounting assembly which is universally adaptable for different types of rideable vehicles and also relatively inexpensive, easily adjustable and provides the associated windshield with the degree of support and stability desired and anticipated.

For example, although sturdy windshield mounting assemblies have generally been provided for heavier vehicles such as motorcycles and snowmobiles, such assemblies have tended to be relatively heavy, bulky expensive and generally non-interchangeable. Additionally, such assemblies have a rather prohibitive application to smaller, lighter vehicles such as bicycles and mopeds wherein not only the maneuverability and operation but also the balance thereof may be adversely affected. Conversely, windshield mounting assemblies commonly applied to bicycles and mopeds are normally lightweight, relatively inexpensive, of simple construction and are not generally designed to withstand severe loading forces commonly associated with high speed vehicles such as motorcycles and snowmobiles which are often driven over irregular and bumpy terrain.

In addition to the design criteria associated with various forces, such as vibrational forces generated when a vehicle intermittently encounters roadway irregularities, a windshield and its accompanying mounting assembly are normally designed so that the windshield will withstand stress concentrations resulting from not only the manner in which the windshield is mounted but also material imperfections and discontinuities such as holes and notches formed therein. For example, when a windshield is deflected by the onrushing air, a complex pattern of stresses are developed therein and it follows that when improperly supported at one or more mounting locations, stress concentrations formed thereabout may result in localized failure of the windshield. Such localized failure is particularly common adjacent windshield mounting holes which generally form weakened zones in the windshield element. As a result, fastening means extending through windshield mounting holes and connected to the adjacent mounting assembly usually include rubber sleeves or cushions to reduce the impact or bearing force transmitted between the mounting assembly and the windshield region adjacent the mounting holes. Although increasing the number of mounting holes will generally distribute the applied loads and thus lessen the effective stresses adjacent individual mounting holes, it has often been difficult to adequately adapt a mounting assembly and its respective plurality of fastening means to windshields of diverse shapes and generally non-planar curved configurations.

Further, it would also be preferable to provide a sturdy, lightweight windshield mounting assembly comprising a selectively adjustable mounting support and a multi-positionable windshield fastening element attached thereto such that windshields of different shapes and sizes can be adequately supported from a vehicle handlebar. Reductions in the cost of a windshield mounting assembly are also important so that such assembly may be economically competitive and affordable to the users of such motorcycles, mopeds and other rideable vehicles.

Windshield mounting assemblies which include windshield fastening means for securing a windshield to a vehicle handlebar are generally disclosed in U.S. Pat. Nos. Re. 23,039, 1,532,008, 2,675,266, 3,801,152 and 3,904,238. The windshield mounting assembly constructed according to the present invention is designed to overcome problems encountered with some of the prior art, such as the non-adaptability for different windshield configurations and the relatively difficult adjustment of the windshield for vertical and horizontal displacements.

SUMMARY OF THE INVENTION

Accordingly, a general aspect of this invention relates to a windshield stabilizing assembly comprising a set of spaced suction cups attached to each other by a nylon fence and centrally located hook type attachment device.

Another aspect of this invention relates to a mounting assembly which includes four spaced suction cup assemblies attached to each horizontal side of the windshield by a nylon fence for adjustment of central tension pulling each side of the windshield closer to the opposite and holding light accessories such as gloves on the dash.

A snowmobile windshield is comprised primarily of a plastic product. The suction cups are most compatible with plastic which bonds easily to the plastic windshield and are flexible with dexterity and simplicity.

The suction cups of the device embody a pilot hole to the side of the vinyl suction cup; about ⅛" diameter to the (side) center of the oblong metal holder of the suction cup, connecting with a pilot hole inserted on the bottom center of the vinyl suction cup.

This should be expressed; the pilot hole on the side of the oblong top of the Suction Cup should interconnect with the pilot hole on the bottom center of the 1¾" diameter Suction Cup. The pilot hole should not exceed further than the pilot hole inserted on the side of the oblong portion of the top of the Suction Cup. Expressly, the pilot hole from the bottom of the suction Cup should not go any further than the interconnecting pilot hole from the side of the oblong attachment; located on the top center of the Vinyl Suction Cup.

The four suction cups with the new Pilot Holes will be tethered with the connecting nylon fence apparatus or tether. As each tether is attached to their respective suction cup, they are attached to each other in the middle with the attachment hook. The tethers can be easily released with the attachment hook when the snowmobile user is in heavy brush or areas where the windshield will require additional flexibility.

This will give the snowmobiler the option of detaching the stabilizer tether when they are caught in the thicket and need the windshield flexible or bend more easily in the thicket. The Windshield; with the tether attached, may be too sturdy when hitting branches in the thicket. When the windshield is too sturdy; especially plastic, it may become more susceptible to breakage or cracking. Likewise, the device works to help the windshield in colder temperatures too.

To make this product to work effectively, the consumer will have to voluntarily drill four pilot holes; about 9/64" diameter into their plastic windshield, located on the sides of the Plastic Windshield.

An instruction manual should be added; to let the snowmobiler know what it can do, and how to attach the Snowmobiler Plastic Windshield Gizmo Stabilizer to their snow machine vehicle.

Accordingly, it is a general object to provide an efficient, economical windshield stabilizing assembly for supporting a windshield from a vehicle handlebar.

Another object of the invention is to provide a relatively lightweight yet rigid nylon fence or vertical guard to hold accessories such as gloves within the dashboard area.

Another object of the invention is to provide a relatively lightweight yet rigid stabilizing assembly which may be easily applied and adjusted to various handlebars.

A further object of the present invention is to provide a relatively simple stabilizing assembly designed to accommodate windshields of diverse sizes and shapes.

A particular object is to provide a stabilizing assembly which may be assembled and disassembled with ease and stored in a compact manner.

Another specific object is to provide multi-positional windshield support elements which permit a windshield to be supported in a wide variety of mounting positions.

BRIEF DESCRIPTION OF THE DRAWING

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawing in which:

FIG. 2 is an elevational view of the nets;

FIG. 3 is an elevational view of the nets with the side sleeves for tethers;

FIG. 5 is an elevational view of the tether hooks;

Figure 1:
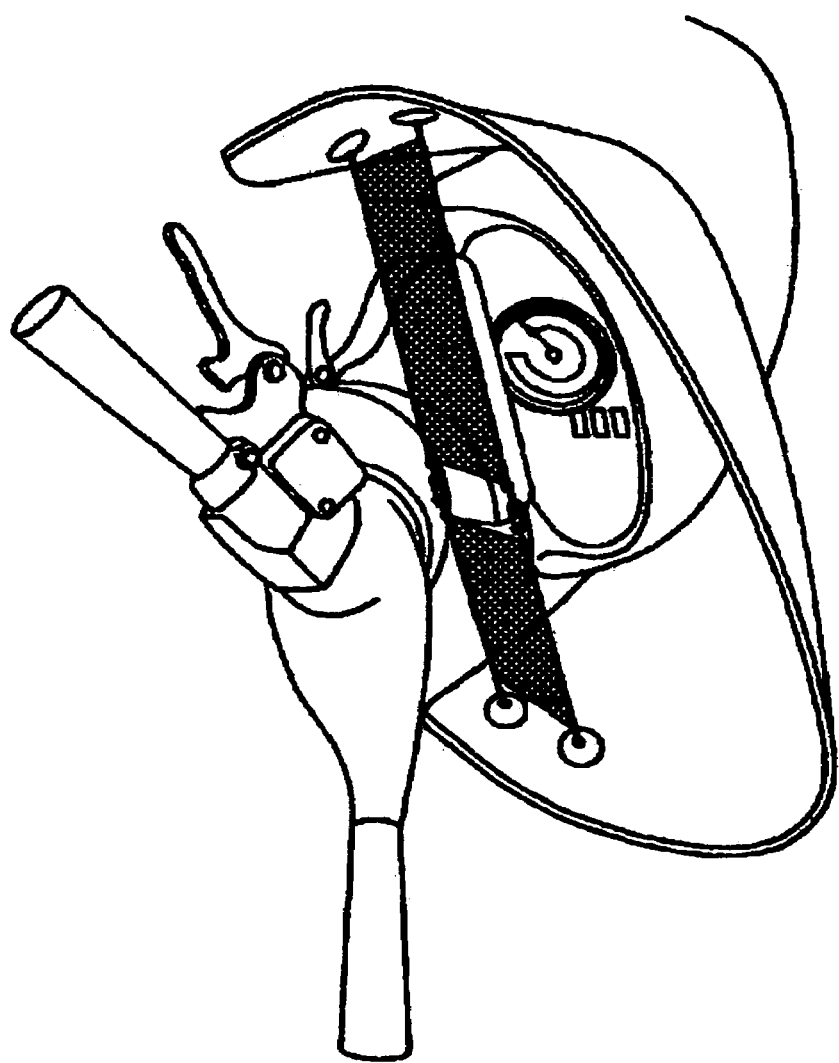
FIG. 1 is a rear elevational view of the stabilizing assembly connecting to a windshield.
Figure 4:
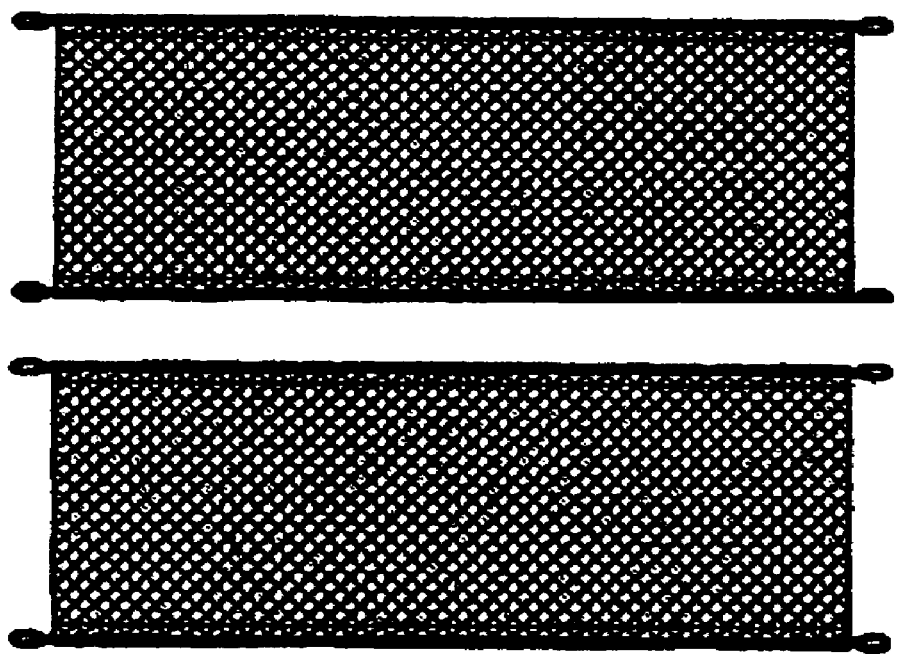
FIG. 4 is an elevational view of the nets with the tension tethers attached.
Figure 6:
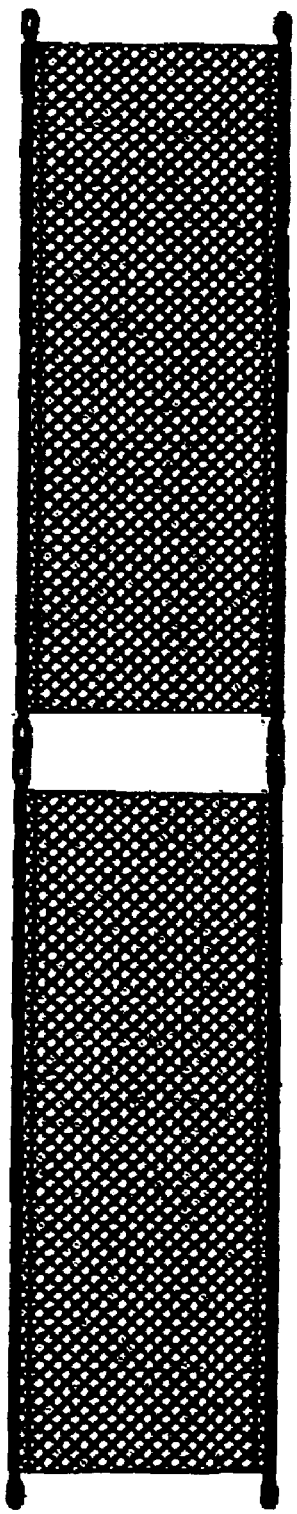
FIG. 6 is an elevational view of the windshield assembly.
Figure 7:
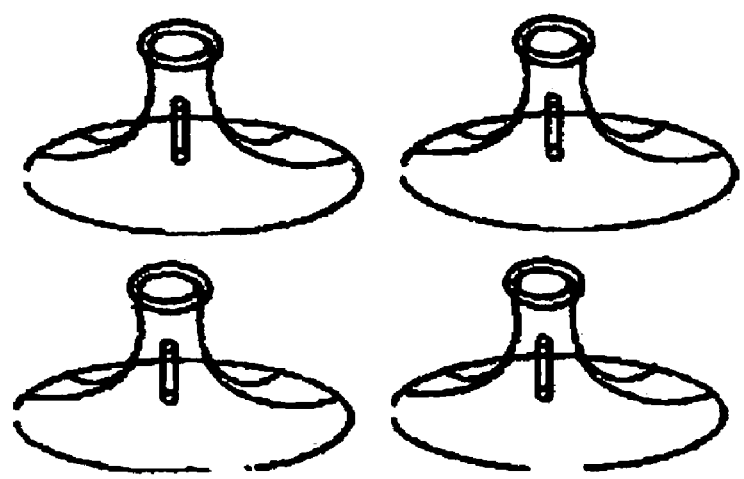
FIG. 7 is an elevational view of the suction cups.

The illustrations and examples provided herein are for explanatory purposes and are not intended to limit the scope of the appended claims, as those skilled in the art will make modifications to the invention for particular uses.

I claim:

1. A snowmobile windshield stabilizer for attachment to a snowmobile windshield, said windshield stabilizer comprising:

at least two nets including tension tethers attached to a top and a bottom of each net, wherein said tension tethers attach to the snowmobile windshield with suction cups, said tension tethers are connected at top and bottom with a quick release tether hook coupling the at least two nets; wherein said windshield stabilizer connects a right side of the snowmobile windshield to a left side of the snowmobile windshield.

* * * * *